US010545348B1

United States Patent
Lu et al.

(10) Patent No.: US 10,545,348 B1
(45) Date of Patent: Jan. 28, 2020

(54) TRANSMISSION IMPROVEMENT FOR FLAT LENS BASED AR/VR GLASSES

(71) Applicant: Facebook Technologies, LLC, Menlo Park, CA (US)

(72) Inventors: Lu Lu, Kirkland, WA (US); Wai Sze Tiffany Lam, Redmond, WA (US); Ningfeng Huang, Redmond, WA (US); Scott Charles McEldowney, Redmond, WA (US); Andrew John Ouderkirk, Kirkland, WA (US); Barry David Silverstein, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/215,234

(22) Filed: Dec. 10, 2018

Related U.S. Application Data

(60) Provisional application No. 62/764,937, filed on Aug. 16, 2018.

(51) Int. Cl.
    *G02B 27/01* (2006.01)
    *G02B 27/48* (2006.01)
    *F21V 8/00* (2006.01)

(52) U.S. Cl.
    CPC ....... *G02B 27/0172* (2013.01); *G02B 6/0056* (2013.01); *G02B 27/48* (2013.01); *G02B 2027/0125* (2013.01); *G02B 2027/0178* (2013.01)

(58) Field of Classification Search
    None
    See application file for complete search history.

(56) References Cited

U.S. PATENT DOCUMENTS

| 2016/0011353 A1* | 1/2016 | Escuti | G02B 27/283 |
| | | | 359/15 |
| 2018/0217377 A1* | 8/2018 | Lam | G02B 27/0172 |
| 2018/0239177 A1* | 8/2018 | Oh | G02F 1/137 |
| 2018/0356639 A1* | 12/2018 | Schaefer | G02B 27/0172 |
| 2019/0049732 A1* | 2/2019 | Lee | G02B 3/10 |

FOREIGN PATENT DOCUMENTS

KR    10-2018-0125349 A   * 11/2018   ......... G02B 27/0172

OTHER PUBLICATIONS

G. Crawford, "Electrically Switchable Bragg Gratings," Optics & Photonics News 14(4), 2003, 6 pages.

* cited by examiner

*Primary Examiner* — Michael Stahl
(74) *Attorney, Agent, or Firm* — Kilpatrick Townsend & Stockton LLP

(57) ABSTRACT

An artificial-reality display uses an anisotropic material to circularly-polarize light exiting a waveguide so that the artificial-reality display is relatively transparent.

20 Claims, 11 Drawing Sheets

TRANSMISSION IMPROVEMENT FOR FLAT LENS BASED AR/VR GLASSES

CROSS REFERENCE TO RELATED APPLICATIONS

This application claims priority to U.S. Provisional Patent Application No. 62/764,937, filed on Aug. 16, 2018, which is incorporated by reference for all purposes.

BACKGROUND

This disclosure relates generally to near-eye-display systems, and more specifically to waveguide displays. Conventional near-eye displays generally have a display element that generates image light that passes through one or more lenses before reaching a user's eye. Additionally, near-eye displays in virtual-reality (VR) systems and/or augmented-reality (AR) systems have design criteria to be compact, be light weight, and provide two-dimensional expansion with a large eye box and a wide field-of-view (FOV). Traditionally, VR displays are magnifier optics displays. A computer generates an image, and optics are used to magnify the image. It is challenging to design near-eye displays to achieve a small form factor, a large FOV, and/or a large eye box.

SUMMARY

The present disclosure relates to artificial-reality displays. More specifically, and without limitation, an anisotropic material to circularly-polarize light exiting a waveguide is used so that an artificial-reality display is relatively transparent.

BRIEF DESCRIPTION OF THE DRAWINGS

Illustrative embodiments are described with reference to the following figures.

Figure 1:
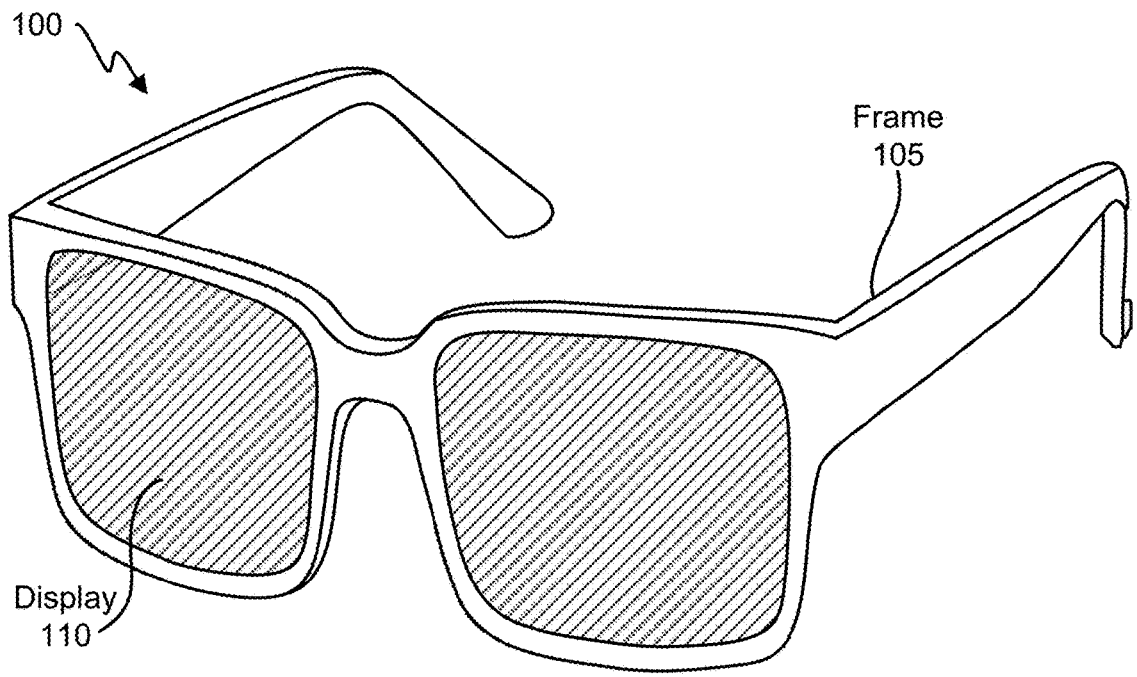
FIG. 1 is a diagram of an embodiment of a near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

This disclosure relates to reducing tint in, and/or increasing efficiency of, an augmented-reality (AR) display. More specifically, and without limitation, this disclosure relates to reducing tint for an AR display that uses a Pancharatnam-Berry Phase (PBP) lens. In U.S. patent application Ser. No. 15/693,846, filed on Sep. 1, 2017, which is incorporated by reference for all purposes, a PBP lens is used to change a focal length of an AR display. The PBP lens is configured specifically to receive circularly-polarized light. Thus a circular polarizer can be placed before the PBP lens to provide the PBP lens with circularly-polarized light. A traditional circular polarizer comprises a linear polarizer and a quarter-wave plate. The linear polarizer, of the circular polarizer, attenuates (e.g., reflects or absorbs) about half of randomly-polarized light. Natural light is randomly-polarized. Thus natural light is attenuated by about half by a lens system having a traditional circular polarizer, and the lens appears darker. A dark lens may not be as socially acceptable in as many situations as glasses used for AR that look clear.

Using a circular polarizer can also reduce efficiency of light from a projector in an AR display. A waveguide can be used in an AR display as a pupil expander through a variety of methods, such as pupil replication. Light is emitted from a projector, coupled into a waveguide, coupled out of the waveguide (e.g., using a grating), and transmitted to a user's eye. The PBP lens is placed between the waveguide and the user's eye to change focus of light emitted from the waveguide, which allows for changing the image plane of the waveguide. Placing a circular polarizer between the waveguide and the PBP lens can reduce transmission of display light, because the linear polarizer of the circular polarizer attenuates light that is not both linearly polarized and aligned with a transmission axis of the linear polarizer.

One way to reduce attenuation by the linear polarizer of the circular polarizer is to remove the linear polarizer and design the grating to emit light from the waveguide with uniform polarization. A waveplate can then be used to change the uniform polarization of light emitted from the waveguide into circularly-polarized light, before the light is transmitted to the PBP lens.

Another way to reduce attenuation by the linear polarizer of the circular polarizer is to linearly polarize light coupling into the waveguide, but instead of designing the gratings to output a uniform polarization, use a non-uniform waveplate that compensates for non-uniform polarization exiting the waveguide. The light out coupled from the waveguide may have non-uniform polarization, but the non-uniformity may be different in a deterministic manner, such that a non-uniform waveplate can be configured to transform the light from the waveguide into uniform circularly-polarized light. The non-uniformity and configuration of the waveplate is dependent on the deterministic manner in which the non-uniform polarized light out couples from the waveguide. By determining local variations of polarizations in light emitted from the waveguide, a waveplate can be designed with local variations in thickness and/or optic axis orientation of the birefringent materials (such as liquid crystals) of the waveplate to convert light emitted from the waveguide into circularly polarized light, without using a linear polarizer.

A further way to reduce attenuation is to use circular polarizers with limited bandwidths. In some embodiments, the projector uses sources with limited bandwidths. For example, the projector could have red, green, and blue light-emitting diodes (LEDs). Three circular polarizers could be placed between the waveguide and the PBP lens. A first circular polarizer could have a first linear polarizer that polarizes a limited bandwidth of red light corresponding to wavelengths of the red LEDs, a second circular polarizer could have a second linear polarizer that polarizers a limited bandwidth of green light corresponding to wavelengths of the green LEDs, and a third circular polarizer could have a third linear polarizer that polarizes a limited bandwidth of blue light corresponding to the blue LEDs. By polarizing only a portion of the visible spectrum, less natural light is attenuated by the linear polarizers.

FIG. 1 is a diagram of an embodiment of a near-eye display 100. The near-eye display 100 presents media to a user. Examples of media presented by the near-eye display 100 include one or more images, video, and/or audio. In some embodiments, audio is presented via an external device (e.g., speakers and/or headphones) that receives audio information from the near-eye display 100, a console, or both, and presents audio data based on the audio information. The near-eye display 100 is generally configured to operate as a virtual reality (VR) display. In some embodiments, the near-eye display 100 is modified to operate as an augmented reality (AR) display and/or a mixed reality (MR) display.

The near-eye display 100 includes a frame 105 and a display 110. The frame 105 is coupled to one or more optical elements. The display 110 is configured for the user to see content presented by the near-eye display 100. In some embodiments, the display 110 comprises a waveguide display assembly for directing light from one or more images to an eye of the user.

Figure 2:
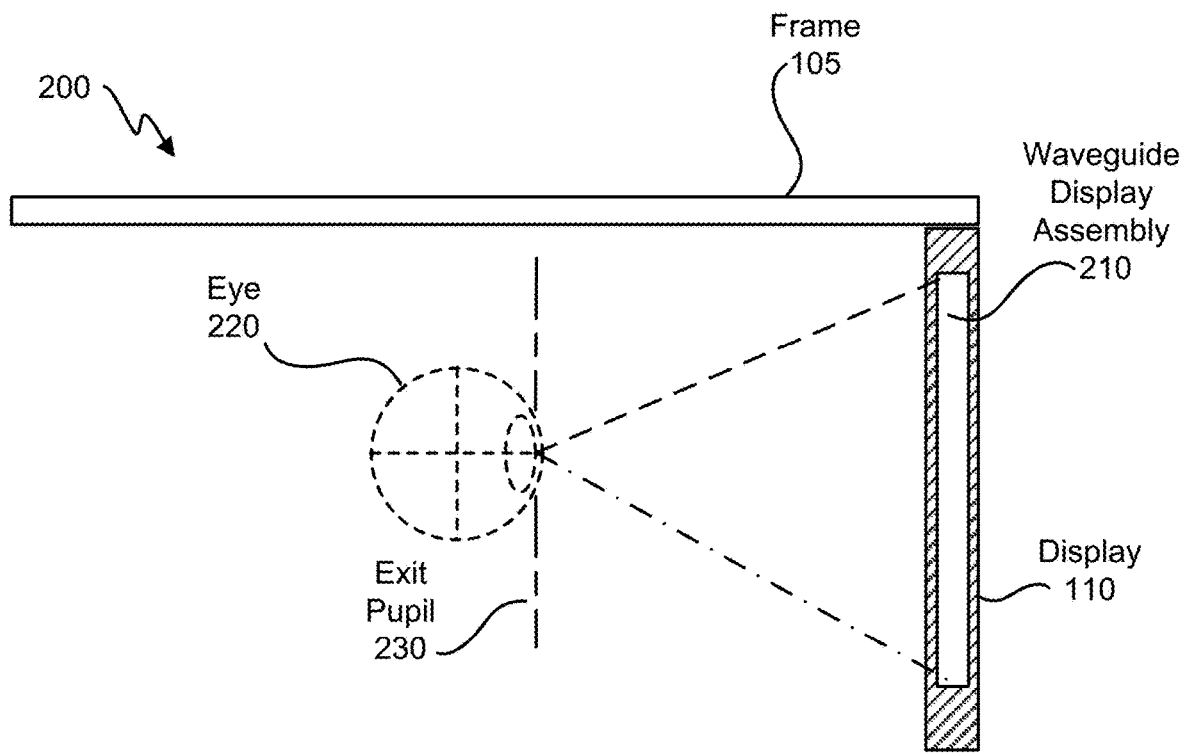
FIG. 2 is an embodiment of a cross section of the near-eye display.

FIG. 2 is an embodiment of a cross section 200 of the near-eye display 100 illustrated in FIG. 1. The display 110 includes at least one waveguide display assembly 210. An exit pupil 230 is a location where the eye 220 is positioned in an eye box region when the user wears the near-eye display 100. For purposes of illustration, FIG. 2 shows the cross section 200 associated with an eye 220 and a waveguide display assembly 210; a second waveguide display assembly is used for a second eye of a user.

The waveguide display assembly 210 is configured to direct image light to an eye box located at the exit pupil 230 and to the eye 220. The waveguide display assembly 210 may be composed of one or more materials (e.g., plastic, glass, etc.) with one or more refractive indices. In some embodiments, the near-eye display 100 includes one or more optical elements between the waveguide display assembly 210 and the eye 220. In some embodiments, the waveguide display assembly 210 includes one or more waveguide displays to generate a singular view to a user.

Figure 3:
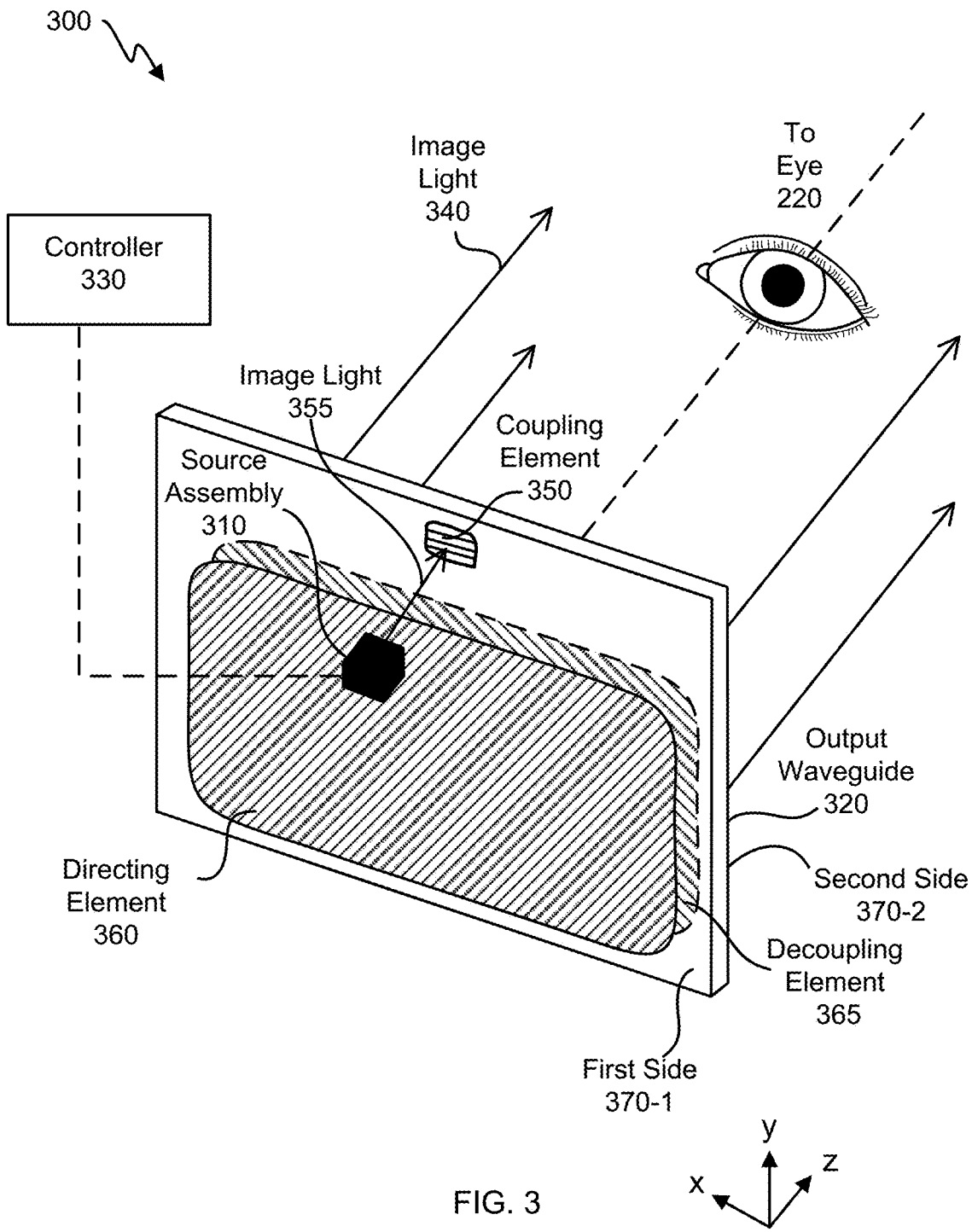
FIG. 3 illustrates an isometric view of an embodiment of a waveguide display.

FIG. 3 illustrates an isometric view of an embodiment of a waveguide display 300. In some embodiments, the waveguide display 300 is a component of the waveguide display assembly 210 of the near-eye display 100. In some embodiments, the waveguide display 300 is part of some other near-eye display or other system that directs image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide displays separate, or partially separate, from the waveguide display 300 provides image light to another eye of the user.

The source assembly 310 generates image light 355. The source assembly 310 generates and outputs the image light 355 to a coupling element 350 located on a first side 370-1 of the output waveguide 320. The output waveguide 320 is an optical waveguide that outputs expanded image light 340 to an eye 220 of a user. The output waveguide 320 receives the image light 355 at one or more coupling elements 350 located on the first side 370-1 and guides received input image light 355. In some embodiments, the coupling element 350 couples the image light 355 from the source assembly 310 into the output waveguide 320. The coupling element 350 may be, e.g., a diffraction grating, a holographic grating, one or more cascaded reflectors, one or more prismatic surface elements, a metalens, a refractive surface at an angle with or without optical power, and/or an array of holographic reflectors.

Light from the output waveguide 320 is coupled out of the output waveguide 320 using a decoupling element 365. Expanded image light 340 decoupled from the output waveguide 320 is transmitted to the eye 220 of a user. In some embodiments, a directing element 360 is used to redirect light in the output waveguide 320 to the decoupling element 365. The directing element 360 is part of, or affixed to, the first side 370-1 of the output waveguide 320. The decoupling element 365 is part of, or affixed to, the second side 370-2 of the output waveguide 320, such that the directing element 360 is opposed to the decoupling element 365. The directing element 360 and/or the decoupling element 365 may be, e.g., a diffraction grating, a holographic grating, one or more cascaded reflectors, one or more prismatic surface elements, a Bragg grating, and/or an array of holographic reflectors.

The second side 370-2 represents a plane along an x-dimension and a y-dimension. The output waveguide 320 may be composed of one or more materials that facilitate total internal reflection of the image light 355 with a transparency in wavelength bands of interest. The output waveguide 320 may be composed of plastic, glass, and/or polymers. The output waveguide 320 has a relatively small form factor. For example, the output waveguide 320 may be approximately 50 mm wide along an x-dimension; 30 mm long along a y-dimension; and 0.3 to 5.0 mm thick along a z-dimension.

In some embodiments, the waveguide display 300 comprises multiple output waveguides 320. For example, waveguide display 300 comprises a stacked waveguide display. The stacked waveguide display is a polychromatic display that can be projected on multiple planes (e.g. multi-planar colored display; a red-green-blue (RGB) display created by stacking output waveguides 320 used for different colors). The stacked waveguide display can comprise three output waveguides 320, one output waveguide 320 for red light, one output waveguide 320 green light, and one output waveguide 320 blue light (sometimes referred to as a waveguide stack). In some configurations, the stacked waveguide display is a monochromatic display that can be projected on multiple planes (e.g. multi-planar monochromatic display). In some configurations, the waveguide display 300 is a varifocal waveguide display. The varifocal waveguide display is a display that can adjust a focal position of image light emitted from the waveguide display. In some embodiments, the waveguide display assembly 210 may include the stacked waveguide display and the varifocal waveguide display. In some embodiments, a single output waveguide 320 is used for a wide spectrum of light. For example, a Bragg grating is used as the decoupling element 365 and out couples red, green, and blue light from the output waveguide 320.

The controller 330 controls light emitted from the source assembly 310. For example, the controller 330 controls scanning operations of the source assembly 310 and/or timing of light sources turning off and on. The controller 330 can determine scanning instructions for the source assembly 310. The controller 330 can be used to control full-field projector engines. In some embodiments, the output waveguide 320 outputs expanded image light 340 with a large field of view (FOV) to the user's eye 220. For example, expanded image light 340 is provided to the user such that the waveguide display 300 has a field of view equal to or greater than 60 degrees and equal to or less than 150 degrees in x and/or y. The output waveguide 320 is configured to provide an eye box with a length equal to or greater than 10 mm and equal to or less than 50 mm in x and/or y. The controller 330 can be used in conjunction with a graphics engine to render image information based on sensors measuring head and/or eye location.

Figure 4:
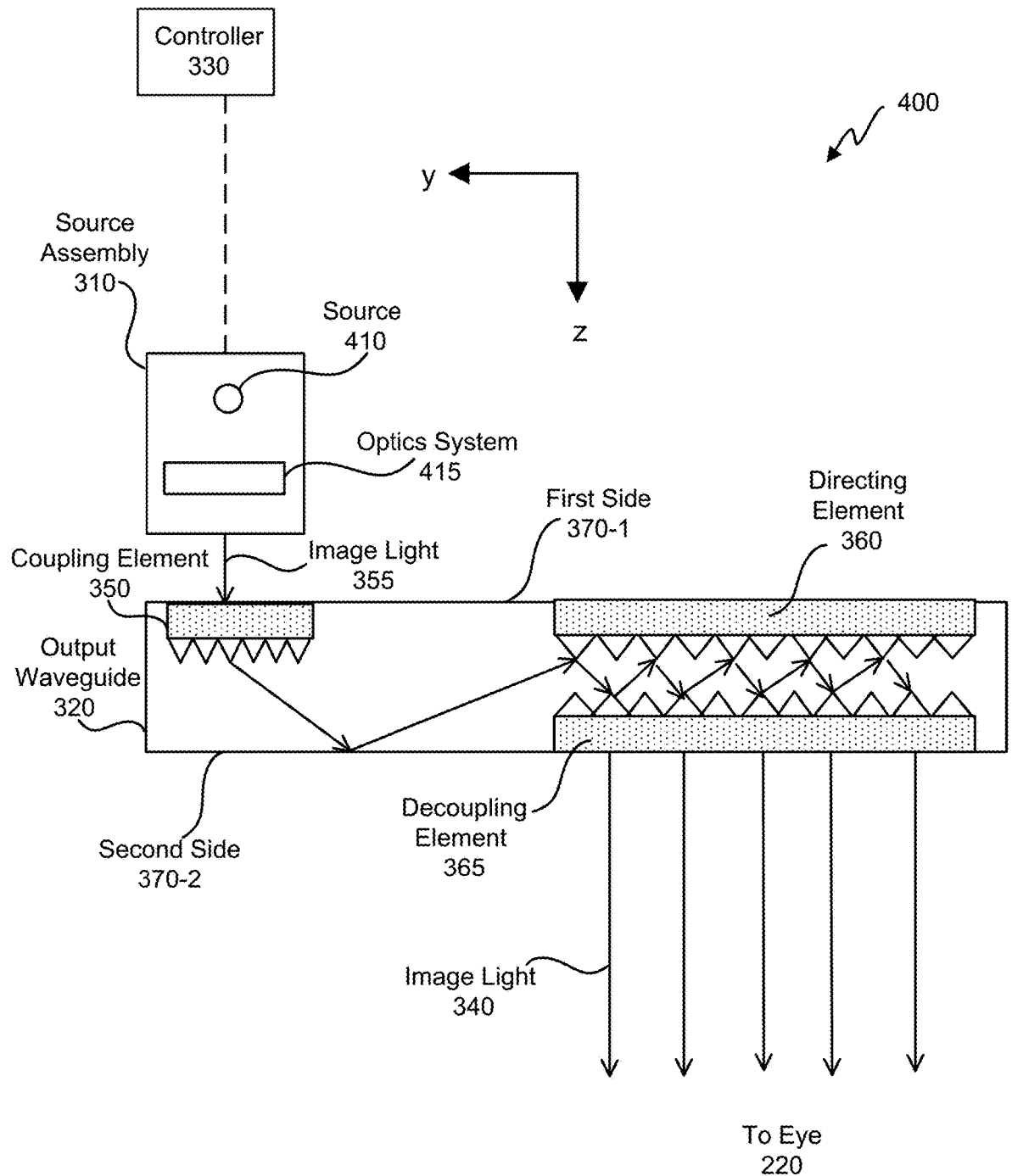
FIG. 4 illustrates a cross section of an embodiment of the waveguide display.

FIG. 4 illustrates an embodiment of a cross section 400 of the waveguide display 300. The cross section 400 includes the source assembly 310 and the output waveguide 320. The source assembly 310 generates image light 355 in accordance with scanning instructions from the controller 330. The source assembly 310 includes a source 410 and an optics system 415. The source 410 is a light source that generates coherent, partially coherent, and/or incoherent light. The source 410 may include one or more of a laser diode, a vertical cavity surface emitting laser, a liquid-crystal-on-silicon, an organic or inorganic light emitting diode, and/or a superluminescent diode.

The optics system 415 includes one or more optical components that condition the light from the source 410. Conditioning light from the source 410 may include, e.g., expanding, collimating, and/or adjusting orientation in accordance with instructions from the controller 330. One or more optical elements in the optics system 415 can be used for despeckling. Speckle forms from coherent light interference. If all light were perfectly coherent and perfect plane waves a macro version of speckle develop: interference fringes. Surface defects essentially create new sources over optical elements that interfere at a micro level creating speckle. Speckle cannot be imaged away, but rather optical elements can be used to decohere or temporally or spatially mix coherent light. Spectral broadening, increasing and mixing angular extent, depolarization, temporal diffusion, can help reduce speckle. Optical elements for despeckling can be placed closer to a final image plane so that new sources for speckle do not emerge. The one or more optical components may include one or more lens, liquid lens, mirror, freeform element, aperture, metamaterials, and/or grating. Light emitted from the optics system 415 (and also the source assembly 310) is sometimes referred to as image light 355.

The output waveguide 320 receives the image light 355. The coupling element 350 couples the image light 355 from the source assembly 310 into the output waveguide 320. In embodiments where the coupling element 350 is diffraction grating, a pitch of the diffraction grating is chosen such that total internal reflection occurs in the output waveguide 320, and the image light 355 propagates internally in the output waveguide 320 (e.g., by total internal reflection), toward the decoupling element 365. The directing element 360 redirects the image light 355 toward the decoupling element 365 for decoupling from the output waveguide 320.

In some embodiments, the directing element 360 and/or the decoupling element 365 are structurally similar. The expanded image light 340 exiting the output waveguide 320 is expanded along one or more dimensions (e.g., may be elongated along x-dimension). In some embodiments, the waveguide display 300 includes a plurality of source assemblies 310 and a plurality of output waveguides 320. Each of the source assemblies 310 emits a monochromatic image light of a specific band of wavelength corresponding to a primary color (e.g., red, green, or blue). Each of the output waveguides 320 may be stacked together with a distance of separation to output an expanded image light 340 that is multi-colored. In some embodiments, other color schemes are used (e.g., RGBW)

Figure 5:
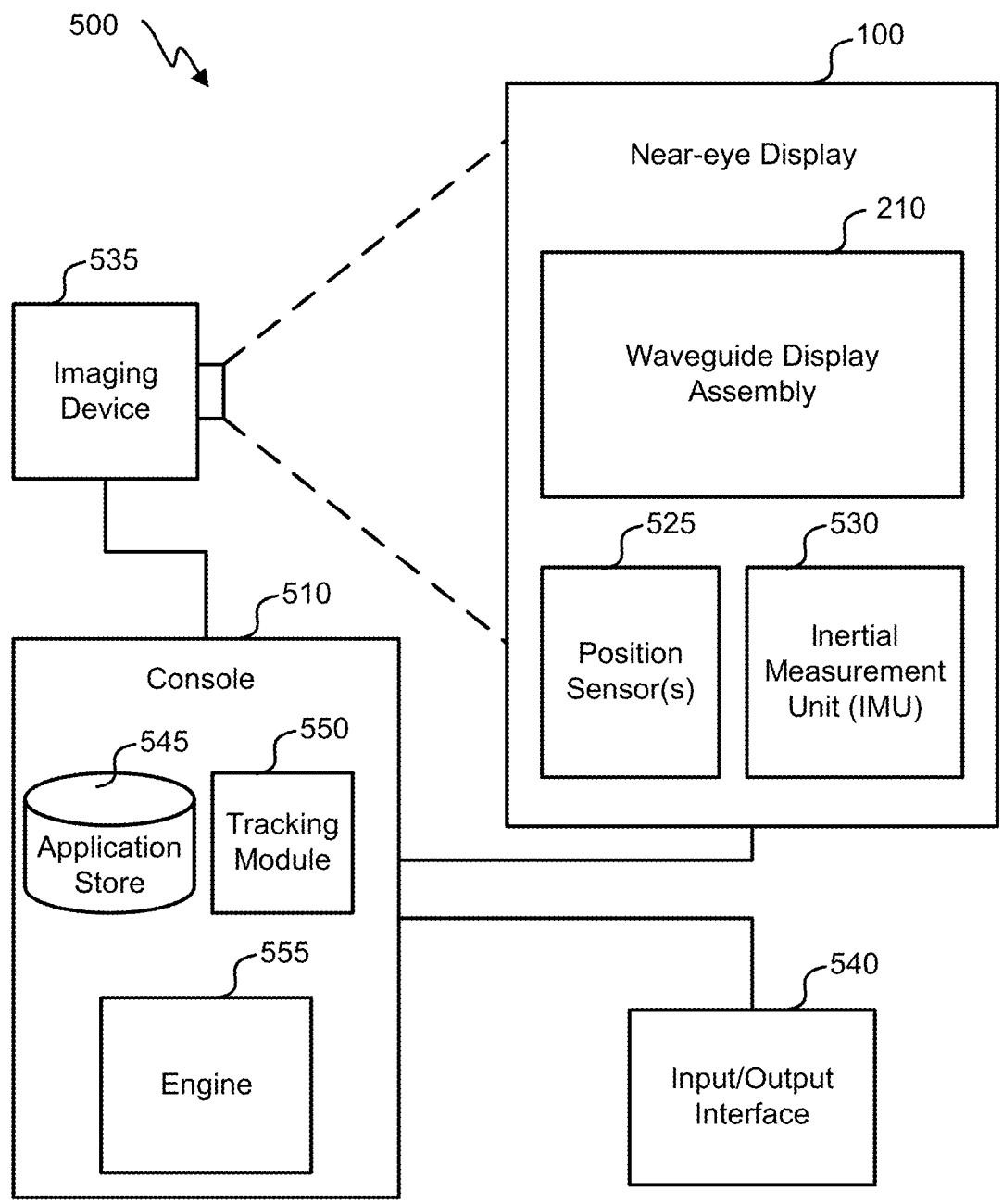
FIG. 5 is a block diagram of an embodiment of a system including the near-eye display.

FIG. 5 is a block diagram of an embodiment of a system 500 including the near-eye display 100. The system 500 comprises the near-eye display 100, an imaging device 535, and an input/output interface 540 that are each coupled to a console 510.

The near-eye display 100 is a display that presents media to a user. Examples of media presented by the near-eye display 100 include one or more images, video, and/or audio. In some embodiments, audio is presented via an external device (e.g., speakers and/or headphones) that receives audio information from the near-eye display 100 and/or the console 510 and presents audio data based on the audio information to a user. In some embodiments, the near-eye display 100 may also act as an AR eyewear glass. In some embodiments, the near-eye display 100 augments views of a physical, real-world environment, with computer-generated elements (e.g., images, video, sound, etc.).

The near-eye display 100 includes a waveguide display assembly 210, one or more position sensors 525, and/or an inertial measurement unit (IMU) 530. The waveguide display assembly 210 includes the source assembly 310, the output waveguide 320, and the controller 330. The IMU 530 is an electronic device that generates fast calibration data indicating an estimated position of the near-eye display 100 relative to an initial position of the near-eye display 100 based on measurement signals received from one or more of the position sensors 525. The imaging device 535 generates slow calibration data in accordance with calibration parameters received from the console 510. The imaging device 535 may include one or more cameras and/or one or more video cameras. The input/output interface 540 is a device that allows a user to send action requests to the console 510. An action request is a request to perform a particular action. For example, an action request may be to start or end an application or to perform a particular action within the application. The console 510 provides media to the near-eye display 100 for presentation to the user in accordance with information received from one or more of: the imaging device 535, the near-eye display 100, and the input/output interface 540. In the example shown in FIG. 5, the console 510 includes an application store 545, a tracking module 550, and an engine 555. The application store 545 stores one or more applications for execution by the console 510. An application is a group of instructions, that when executed by a processor, generates content for presentation to the user. Examples of applications include: gaming applications, conferencing applications, video playback application, or other suitable applications. The tracking module 550 calibrates the system 500 using one or more calibration parameters and may adjust one or more calibration parameters to reduce error in determination of the position of the near-eye display 100. The tracking module 550 tracks movements of the near-eye display 100 using slow calibration information from the imaging device 535. The tracking module 550 also determines positions of a reference point of the near-eye display 100 using position information from the fast calibration information.

The engine 555 executes applications within the system 500 and receives position information, acceleration information, velocity information, and/or predicted future positions of the near-eye display 100 from the tracking module 550. In some embodiments, information received by the engine 555 may be used for producing a signal (e.g., display instructions) to the waveguide display assembly 210 that determines a type of content presented to the user.

Figure 6:
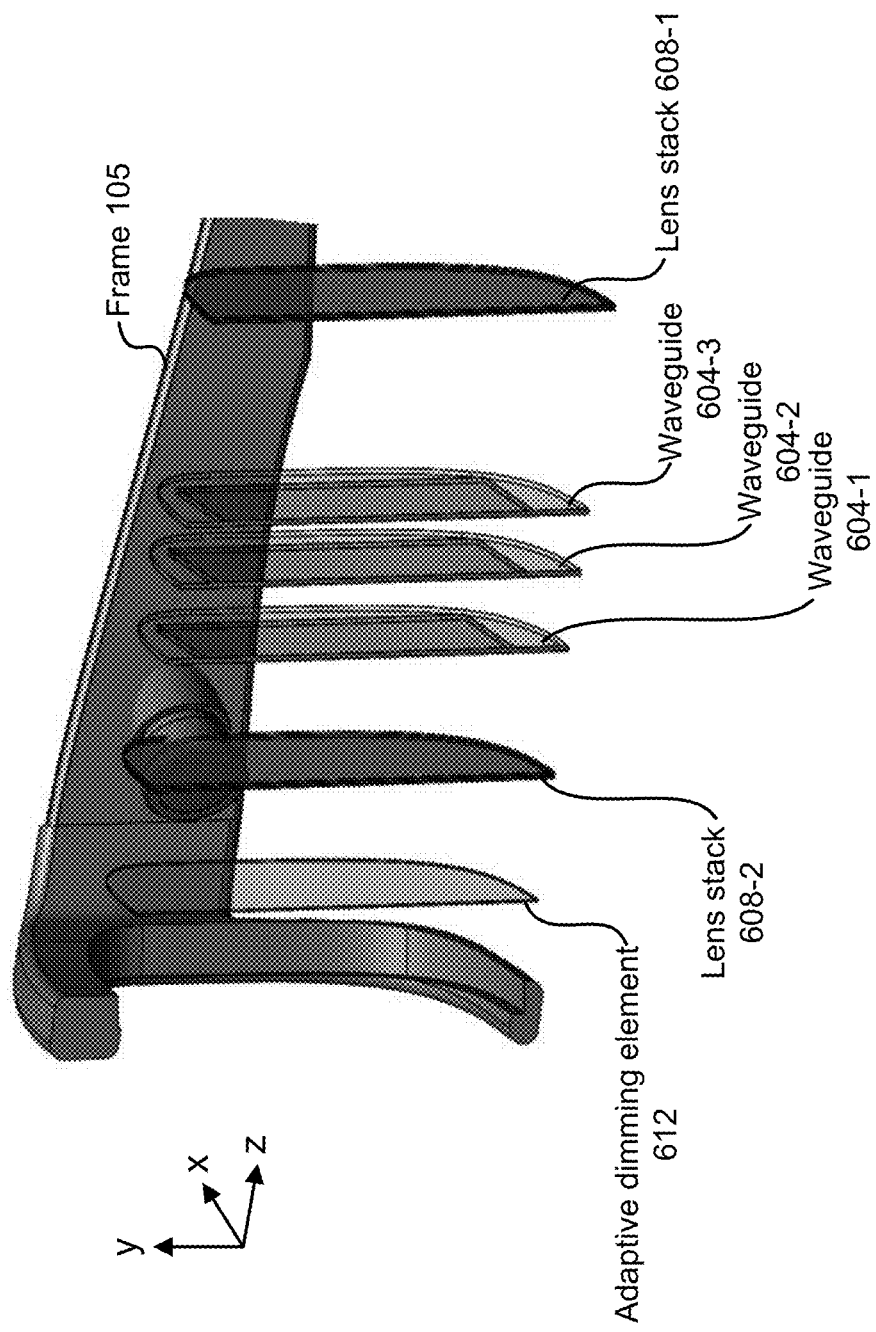
FIG. 6 is an exploded view of an embodiment of a lens system of a waveguide display assembly.

FIG. 6 is an exploded view of an embodiment of a lens system of a waveguide display assembly 210. The lens system comprises one or more waveguides 604 (e.g., similar to the output waveguide 320) and one or more lens stacks 608. The lens system in the embodiment shown in FIG. 6 comprises a first waveguide 604-1, a second waveguide 604-2, a third waveguide 604-3, a first lens stack 608-1, a second lens stacks 608-2, and an adaptive dimming element 612. The lens system is secured in the frame 105. Light from the source 410 is coupled into a waveguide 604 using a coupling element 350. Light is guided in the waveguide 604 (e.g., using total internal reflection) and coupled out of the waveguide 604 using a decoupling element 365. Light coupled out of the waveguide 604 is directed toward an eye 220 of a user of a near-eye display 100. The waveguides 604 are part of the near-eye display 100.

A waveguide 604 and/or a decoupling element 365 for a waveguide 604 can be built for a specific wavelength, or frequency band, of light. For example, the decoupling element of the first waveguide 604-1 is designed to decouple red light; the decoupling element of the second waveguide 604-2 is designed to decouple green light; and the decoupling element of the third waveguide 604-3 is designed to decouple blue light. In some embodiments, the decoupling element of the first waveguide 604-1 is designed to decouple blue light; the decoupling element of the second waveguide 604-2 is designed to decouple green light; and the decoupling element of the third waveguide 604-3 is designed to decouple red light. In some embodiments, other ordering of colors of waveguides 604 is used and/or more than three or less than three waveguides 604 are used. In some embodiments one waveguide 604 is used, and the decoupling element is configured to decouple red, green, and blue light.

The first lens stack 608-1 is between the waveguides 604 and the eye 220 of the user. The waveguides 604 are between the second lens stack 608-2 and the first lens stack 608-1. In some embodiments, the second lens stack 608-2 is oriented orthogonally to the first lens stack 608-1. The second lens stack 608-2 can have similar elements as the first lens stack 608-1, arranged in similar or different orders; the second lens stack 608-2 can have different elements than the first lens 608-1. In some embodiments, the second lens stack 608-2 is not used. The adaptive dimming element 612 provides variable light attenuation (e.g., to make the lens system darker to a user when the user goes outside on a bright day). The second lens stack 608-2 can be used to offset focusing power of the first lens stack 608-1 so that natural light does not appear to change focus even though focus of light exiting the waveguides 604 is changed by the first lens stack 608-1. For example, the first lens stack 608-1 and the second lens stack 608-2 each have a Pancharatnam Berry Phase (PBP) lens and a waveplate. Light from the real world, having random polarization, passes through the PBP lens of the second stack 608-2, and half the light is focused and half the light is defocused, assuming equal amounts of right-handed, circularly-polarized light and left-handed, circularly-polarized light; a retardance is added to an axis as light passes through the waveplate of the second lens stack 608-2; light passes through the waveguides 604 and does not "see" gratings of the waveguides 604 because of angular selectivity of the gratings; light passes through the waveguide of the first lens stack 608-1, which undoes the retardance of the waveplate of the second lens stack 608-2; and light passes through the PBP lens of the first lens stack 608-1, which undoes focusing and defocusing of the PBP lens of the second lens stack 60-2.

Figure 7:
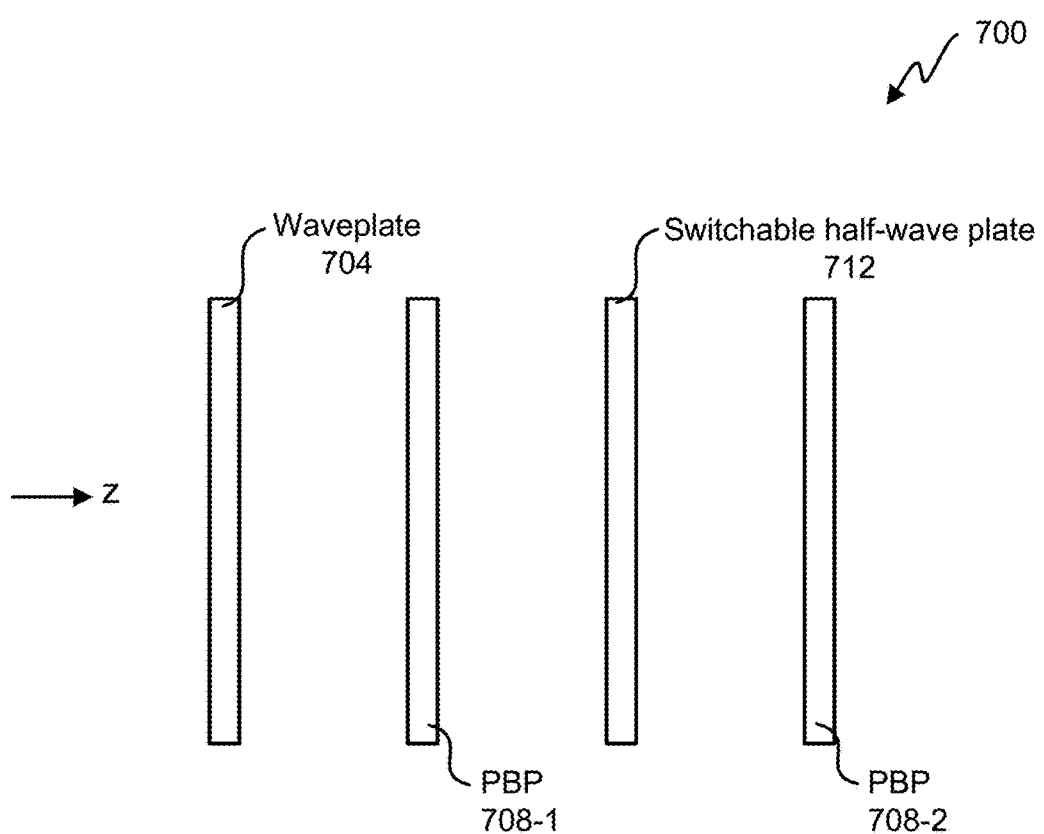
FIG. 7 is an exploded view of an embodiment of a lens stack in the lens system.

FIG. 7 is an exploded view of an embodiment 700 of the first lens stack 608-1. The first lens stack 608-1 comprises a waveplate 704, a first Pancharatnam Berry Phase (PBP) lens 708-1, a switchable half-wave plate 712, and a second PBP lens 708-2. Of note, a linear polarizer is not between the waveguide 604 and the PBP lens 708. U.S. application Ser. No. 15/693,846, filed on Sep. 1, 2017, discloses PBP lenses for use in optical compensation. The '846 application is incorporated by reference for all purposes. The PBP lens 708 is a type of geometric-phase lens and is specifically designed to receive circularly polarized light. A geometric-phase lens can also be referred to as a flat lens. A flat lens is based on metasurfaces, which can use nano structures to modify light based on polarization. For example, a flat lens can focus light by acting as a converging lens for one handedness of circularly-polarized light (e.g., right-handed circularly-polarized light) and acting as a diverging lens for an orthogonal handedness of circularly-polarized light (e.g., left-handed circularly-polarized light). In another example, a flat lens can reflect one handedness of circularly-polarized light and transmit an orthogonal handedness of circularly-polarized light. The geometric-phase lens can comprise liquid crystal polymers. In some embodiments, elements of the lens stack 608 are bonded together.

A circular polarizer can be placed in front of the PBP lens 708 to provide circularly-polarized light to the PBP lens 708. For example, if the flat lens focuses right-handed circularly-polarized light by causing light rays to converge, a right-handed circular polarizer can be placed in front of the PBP lens 708. However, a right-handed circular polarizer comprising a linear polarizer will attenuate light passing through the right-handed circular polarizer so that the lens system appears darkened because the linear polarizer attenuates light that is not linearly polarized and oriented along a transmission axis of the linear polarizer. The circular polarizer also comprises a quarter-wave plate. The quarter-wave plate can be made of a birefringent material having a fast axis and a slow axis. The fast axis of the quarter-wave plate is aligned at 45 degrees with the transmission axis of the linear polarizer. Light passing through the linear polarizer will be polarized along the transmission axis and converted from linearly-polarized light to circularly-polarized light by passing through the quarter-wave plate. Because the linear polarizer of the circular polarizer attenuates randomly-polarized light, the lens system will appear dark (e.g., like sunglasses). A darkened lens system may not be as socially acceptable as a lens that is more transparent. Further, having a linear polarizer between the waveguide 604 in the PBP lens 708 may require more power consumption by the source 410 to transmit a brighter image to the eye 220 of the user because of attention by the linear polarizer.

The waveplate 704 is used without a linear polarizer between the waveguide 604 and the PBP lens to create circularly-polarized light from light coupled out of the waveguide 604. The waveplate 704 is sometimes referred to as a first lens. The waveplate 704 is made of an optically anisotropic material. For example, the waveplate 704 comprises a birefringent material. The PBP lenses 708 and the switchable half-wave plate 712 are used to change a focal length of the lens system (e.g., as described in the '846 application). The waveplate 704 is configured to convert light coupled out of one or more waveguides 604 into circularly-polarized light.

Figure 8:
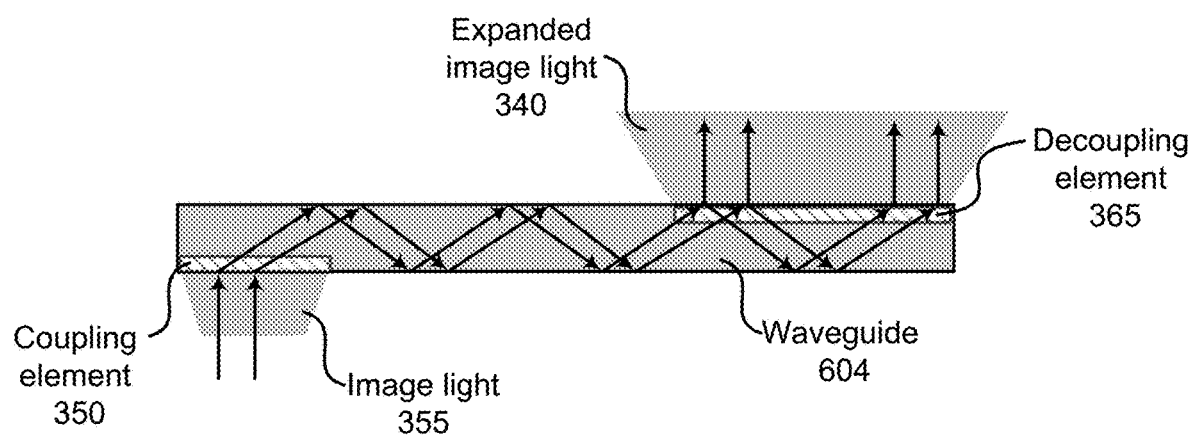
FIG. 8 illustrates a cross section of an embodiment of a waveguide.

FIG. 8 illustrates a cross section of an embodiment of a waveguide 604. Image light 355 is coupled into the waveguide 604 by the coupling element 350. Light is guided in the waveguide 604 by total internal reflection. Light is coupled out of the waveguide 604 by the decoupling element 365 as expanded image light 340. The image light 355 can be polarized (e.g., p or s polarized by placing a linear polarizer before the coupling element 350 and/or by using a polarized light source, such as a laser diode). In some embodiments, the waveguide 604, the coupling element 350, and/or the decoupling element 365 are designed to output polarized light (e.g., uniform linearly-polarized light or uniform elliptically-polarized light). For example, a surface relief grating or liquid crystal Bragg grating could be used as disclosed in Gregory P. Crawford, "Electrically Switchable Bragg Gratings," Optics & Photonics News 14(4), 54-59 (2003), which is incorporated by reference. In some embodiments, light coupled out of the waveguide 604 has non-uniform polarization.

Figure 9:
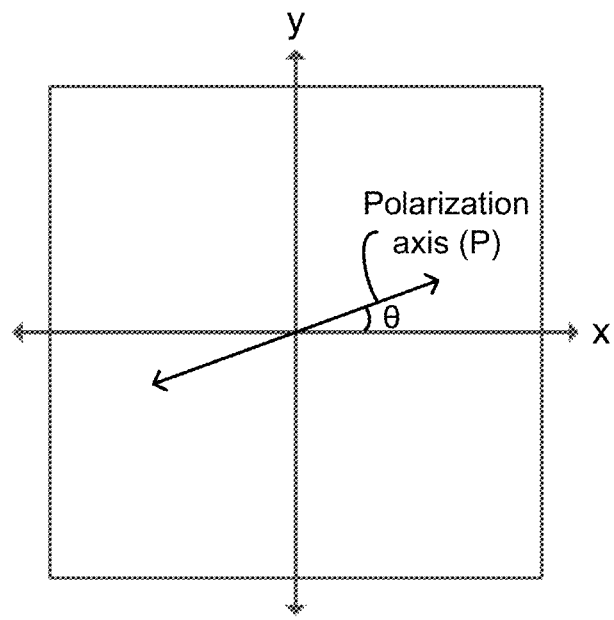
FIG. 9 illustrates a first example of polarization of light exiting a waveguide.

FIG. 9 illustrates a first example of polarization of light exiting a waveguide 604, wherein the expanded image light 340 has uniform polarization. Light exiting the waveguide 604 can have uniform polarization by designing a grating to decouple light with uniform polarization (e.g., as described in Gregory P. Crawford, "Electrically Switchable Bragg Gratings," Optics & Photonics News 14(4), 54-59 (2003)). Polarization of light coupled out of the waveguide 604 (e.g., expanded image light 340) is represented by a line labeled polarization axis P. The polarization axis P makes an angle θ with the x-axis. The polarization axis P can represent linear polarization and/or a major axis for elliptical polarization. Since polarization of the expanded image light 340 is uniform, polarization is constant over an x/y space, P(x, y)=θ (a constant). The waveplate 704 can be designed to change the expanded image light 340 into circularly-polarized light (e.g., by making the waveplate 704 a quarter-wave plate and orienting a fast axis of the quarter-wave plate at 45 degrees to θ, as described below).

Figure 10:
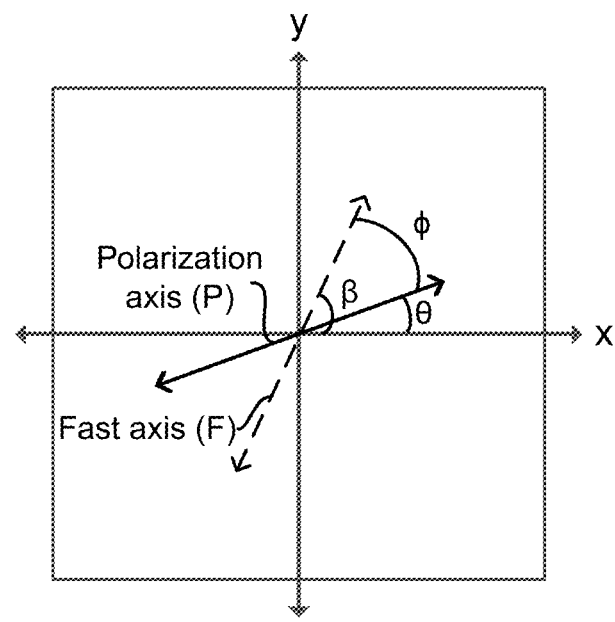
FIG. 10 illustrates an embodiment of a fast axis orientation for a lens having an anisotropic material.

FIG. 10 illustrates an embodiment of a fast axis F orientation for a lens (e.g., waveplate 704) having an anisotropic material. The anisotropic material is birefringent (i.e., displaying two different indices of refraction). The birefringent material has a fast axis F and a slow axis. The slow axis is usually orthogonal to the fast axis F, but does not have to be. The fast axis F of the waveplate 704 is designed to be an angle φ from the polarization axis P, so that expanded image light 340 is converted into circularly-polarized light. The fast axis F is at an angle β from the x-axis, such that β=θ+φ. If the polarization of the expanded image light 340 is linearly polarized, then φ can equal +/−45° using a quarter-wave plate for the waveplate 704, depending on which handedness of circularly-polarized light is desired. For simplicity, this disclosure will provide examples using positive φ values, and it is understood that negative φ values can also be used. The angle φ does not have to be 45°. For converting elliptically-polarized light into circularly-polarized light, the angle φ can be different from 45° and/or a thickness of the waveplate 704 can be changed. For uniform polarization of the expanded image light 340, the fast axis F(x,y)=θ+φ (i.e., constant). By using the waveplate 704, without a linear polarizer between the waveguide 604 and the waveplate 704, light can be circularly polarized for the PBP lens 708 with less loss compared to using a linear polarizer with the waveplate 704.

Figure 11:
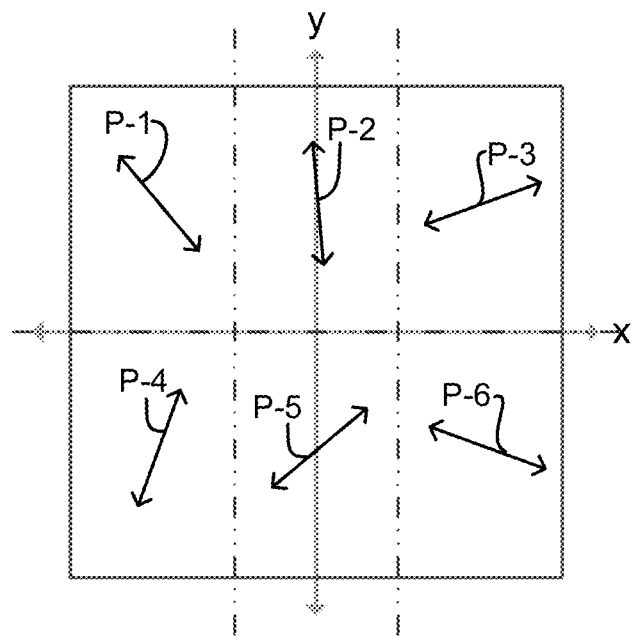
FIG. 11 illustrates a second example of polarization of light exiting a waveguide.

FIG. 11 illustrates a second example of polarization of light exiting a waveguide 604, wherein the expanded image light 340 is spatially non-uniform. Polarization of light can change in the waveguide 604 (e.g., by reflections within the waveguide). Though polarization of light exiting the waveguide 604 is non-uniform, it is deterministic. In general, polarization varies spatially and angularly with wavelength because a grating response is wavelength and angular dependent. Also, ray paths within a waveguide for each wavelength are slightly different. Since these variation are deterministic, a spatially-varying waveplate can be designed to compensate for variations in polarization. The waveplate can use a multilayer birefringence film to generate an appropriate angular response.

The x/y space of the expanded image light 340 is divided into m rows and n columns. In FIG. 11, m equals two, and n equals three, so that there are six quadrants. Quadrants can be referred to as zones. A zone can be a closed two-dimensional shape (e.g., a rectangle, a polygon, or a freeform area). In FIG. 11, the zones are rectangles. In practice, values for m and n are usually higher than 2 or 3 (e.g., m and/or n is equal to or greater than 5, 7, or 10 and/or equal to or less than 12, 15, or 20). A polarization axis P of the six different quadrants are shown. A first polarization axis P-1 has an orientation about θ=130° in a first quadrant. A second polarization axis P-2 has an orientation of about θ=95° in a second quadrant. A third polarization axis P-3 has an orientation of about θ=20° in a third quadrant. A fourth polarization axis P-4 has an orientation of about θ=70° in a fourth quadrant. A fifth polarization axis P-3 has an orientation of about θ=40° in a fifth quadrant. A sixth polarization axis P-6 as an orientation of about θ=160° in a sixth quadrant. Thus the angle θ is not constant but is spatially dependent in x and y, θ (x,y), and the polarization axis P is spatially dependent in x and y, P(x,y)=θ (x,y). A waveplate 704 for spatially non-uniform, linearly-polarized light can be created to change expanded image light 340 by having a birefringence that varies as a two-dimensional function of position on the waveplate 704. Thus a matching retarder (e.g., waveplate 704) can be zoned relative to the waveguide polarization angle and/or ellipticity in order to create substantially circular polarization within a tolerance such that the PBP lens focal positional error is below a threshold that can be defined by wave front error, point spread function error, or other image quality metric. A plurality of zones can be determined such that a residual defocus of combined light is below a threshold value.

Figure 12:
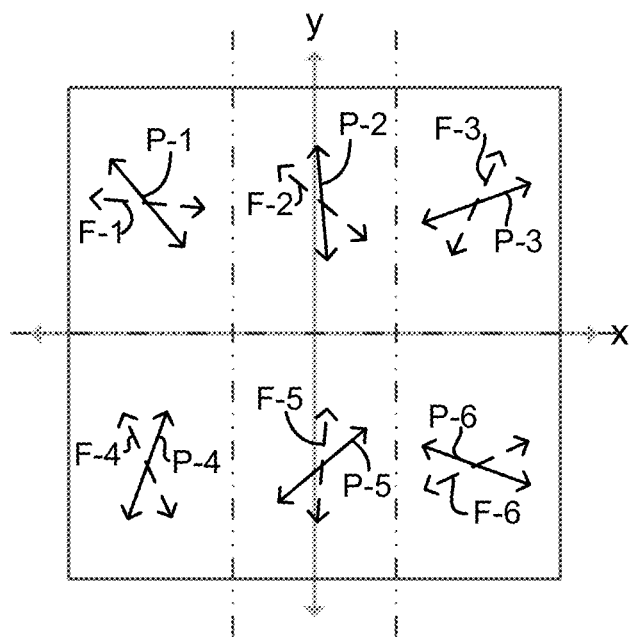
FIG. 12 illustrates an embodiment of fast axis orientations for a lens having an anisotropic material with a birefringence property that varies spatially.

FIG. 12 illustrates an embodiment a waveplate 704 configured to convert light that is spatially non-uniform (e.g., light as described in FIG. 11) into circularly-polarized light. The waveplate 704 has an anisotropic material with a birefringence that varies spatially across the lens so that a fast axis F of the birefringence is a function of x and y. The waveplate 704 is divided into m rows and n columns, similarly as dividing x/y space of the expanded image light 340 in FIG. 11, so that there are six quadrants. The fast axis F of the anisotropic material varies as a function of x and y to match the polarization axis P (e.g., F(x,y)=P(x,y)+ϕ). In some embodiments, the angle ϕ also varies as a function of x and y (e.g., quadrant two could be more linearly polarized than quadrant one, quadrant one being more elliptically polarized; thus angle ϕ could be different in quadrant two than in quadrant one). In an embodiment with the polarization of the expanded image light 340 being linearly polarized and non-uniform, a first fast axis F-1 has an orientation of about β=175° in the first quadrant; a second fast axis F-2 has an orientation of about β=140° in the second quadrant; a third fast axis F-3 has an orientation of about β=65° in the third quadrant; a fourth fast axis F-4 has an orientation of about β=115° in the fourth quadrant; a fifth fast axis F-5 has an orientation of about β=85° in the fifth quadrant; and a sixth fast axis F-6 has an orientation of about β=205° in the sixth quadrant. Thus an orientation of the first fast axis F-1 in the first quadrant is at a first angle, and the orientation of the second fast axis F-2 in the second quadrant is at a second angle, wherein the first angle is not equal to the second angle.

Since polarization of light exiting the waveguide 604 is deterministic, the polarization can be characterized. The waveplate 704 is built based on characterizing polarization of light coupled out of the waveguide 604. For example, output from the waveguide 604 is divided into m×n zones (as described in FIG. 11). A spatially-varying retarder (e.g., waveplate 704) is constructed by also dividing the spatially-varying retarder into m×n zones. In some embodiments, m and/or n are equal to or greater than 7 and equal to or less than 100 (e.g., m=n=5, 10, or 20). A fast axis F in each zone is matched (and/or thickness of the spatially-varying retarder is matched) to the polarization P of light in that zone to convert light emitted from the waveguide 604 into circularly-polarized light. By spatially matching the fast axis F to the polarization axis P in each zone, the waveplate 704 produces circularly-polarized light for the PBP lens 708 (sometimes referred to as a second lens) with less loss compared to using a linear polarizer with the waveplate 704. Thus a linear polarizer is not used between the waveguide 604 in the PBP lens 708, and the lens system is more transparent than if the lens system had a linear polarizer.

Figure 13:
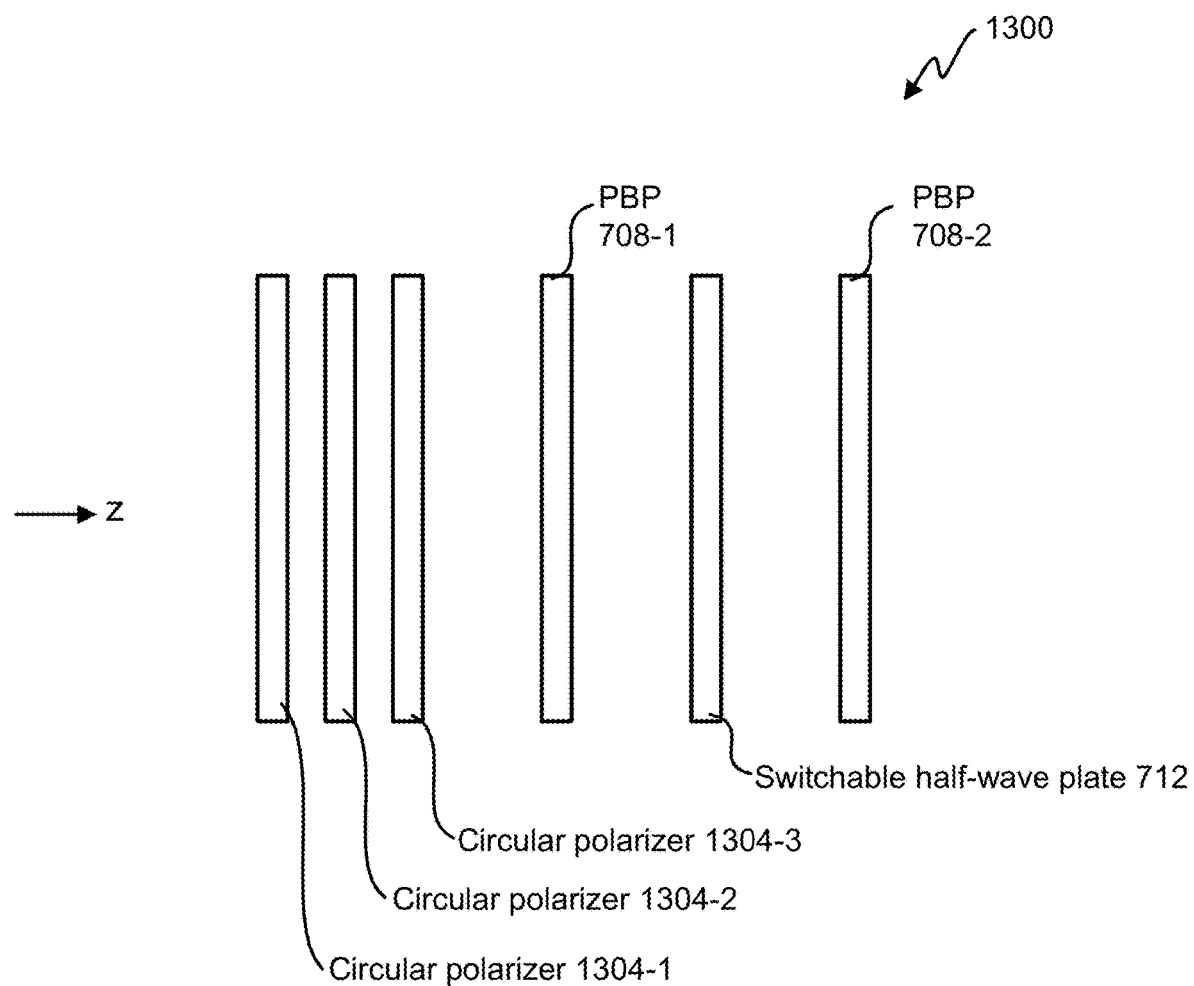
FIG. 13 is an exploded view of another embodiment of a lens stack.

FIG. 13 is an exploded view of another embodiment 1300 of the first lens stack 608-1. The first lens stack 608-1 in the embodiment 1300 comprises three circular polarizers 1304. A circular polarizer can be made by using a linear polarizer and a quarter-wave plate, wherein a transmission axis of the linear polarizer is offset from a fast axis of the quarter-wave plate by 45°. The circular polarizers 1304 comprise a linear polarizer and a waveplate (e.g., a quarter-wave plate). The circular polarizers 1304 have narrow bandwidths, such that the linear polarizers of the circular polarizers 1304 polarize light only within the narrow bandwidth. In some embodiments, narrow bandwidth is equal to or greater than 5, 10, or 15 nm and equal to or less than 20, 30, 35, 40, 50, 75, or 80 nm (e.g., as measured full width, half max). In some embodiments, circular polarizers 1304 have narrow bandwidths centered on different wavelengths (e.g., to filter red, green, and blue light).

A first circular polarizer 1304-1 comprises a first linear polarizer and a first waveplate. The first linear polarizer has a first polarization bandwidth; the first polarization bandwidth is equal to or greater than 5 nm and equal to or less than 50 nm; and the first linear polarizer has a first transmission axis. The first waveplate is configured to convert light polarized in a direction of the first transmission axis into circularly-polarized light. A second circular polarizer 1304-2 comprises a second linear polarizer and a second waveplate. The second linear polarizer has a second polarization bandwidth; the second polarization bandwidth is equal to or greater than 5 nm and equal to or less than 50 nm; and the second linear polarizer has a second transmission axis. The second waveplate is configured to convert light polarized in a direction of the second transmission axis into circularly-polarized light. A third circular polarizer 1304-3 comprises a third linear polarizer and a third waveplate. The third linear polarizer has a third polarization bandwidth; the third polarization bandwidth is equal to or greater than 5 nm and equal to or less than 50 nm; and the third linear polarizer has a third transmission axis. The third waveplate is configured to convert light polarized in a direction of the third transmission axis into circularly-polarized light.

The first circular polarizer 1304-1 is used to polarize red expanded image light 340; the second circular polarizer 1304-2 is used to polarize green expanded image light 340; and the third circular polarizer 1304-3 is used to polarize blue expanded image light 340. By having narrow bands, circular polarizers 1304 attenuate less light than having a broadband linear polarizer as part of a circular polarizer because only a portion of ambient light is polarized by linear polarizers of the circular polarizers 1304. Take for example a natural light spectrum from 400 to 700 nm; a 300 nm spectrum. If a traditional linear polarizer is used, about half the natural light will be absorbed (or reflected) by the traditional linear polarizer. But if three circular polarizers 1304 are used, each having a polarization bandwidth of 30 nm, then only 90 nm of the natural light 300 nm spectrum will be polarized. Assuming 50% loss for each wavelength, and equal magnitudes for each wavelength of natural light, then loss is closer to 15% (e.g., 0.5*90/300) instead of close to 50%. Thus natural light is less attenuated by using circular polarizers having a linear polarizer with a narrow bandwidth, and the lens system appears more transparent.

In some embodiments, a single circular polarizer 1304 is used. For example, only red light could be used for the source 410 (e.g., for a near-eye display for a pilot of an airplane). Then the first circular polarizer 1304-1 is the only circular polarizer 1304 used, and not the second circular polarizer 1304-2 or the third circular polarizer 1304-3, to change the red light into circularly-polarized light. Similarly, if the source 410 comprises more than three colors, then more than three circular polarizers 1304 can be used.

The circular polarizer 1304 can be placed before the PBP lens 708 (farther from the eye than the PBP lens 708) or after the PBP lens 708 (e.g., closer to the eye than the PBP lens 708). In either configuration, the circular polarizer 1304 blocks an orthogonal polarization of light (e.g., light of un-preferred polarization passes through the PBP lens 708, is focused oppositely than light of a preferred polarization, and is then blocked by the circular polarizer 1304 before reaching the eye). In some embodiments, the circular polarizer 1304 is placed after the PBP lens 708 because some displays emit linearly-polarized light. In a worst case scenario, light emitted by a display could be totally blocked by the circular polarizer if a linear polarizer of the circular polarizer is oriented orthogonal to polarization of the display, and the circular polarizer 1304 is between the display and the PBP lens 708. Further, by having the circular polarizer 1304 after the PBP lens 708, then a quarter-wave plate is not used in the second lens stack 608-2 to compensate for retardance of the circular polarizer 1304. Light from the real world passes through a PBP lens of the second lens stack 608-2 and is reversed by the PBP lens 708 of the first lens stack 608-1. The circular polarizer 1304 absorbs 50% of light in that band.

In some embodiments, multiple (e.g., three) narrowband linear polarizers are used with one quarter-wave plate. Thus a circular polarizer 1304 could comprise three linear polarizers (e.g., one red, one green, and one blue) and only one quarter-wave plate. Some embodiments use just one quarter-wave plate because a wideband achromatic quarter-wave plate is common.

Figure 14:
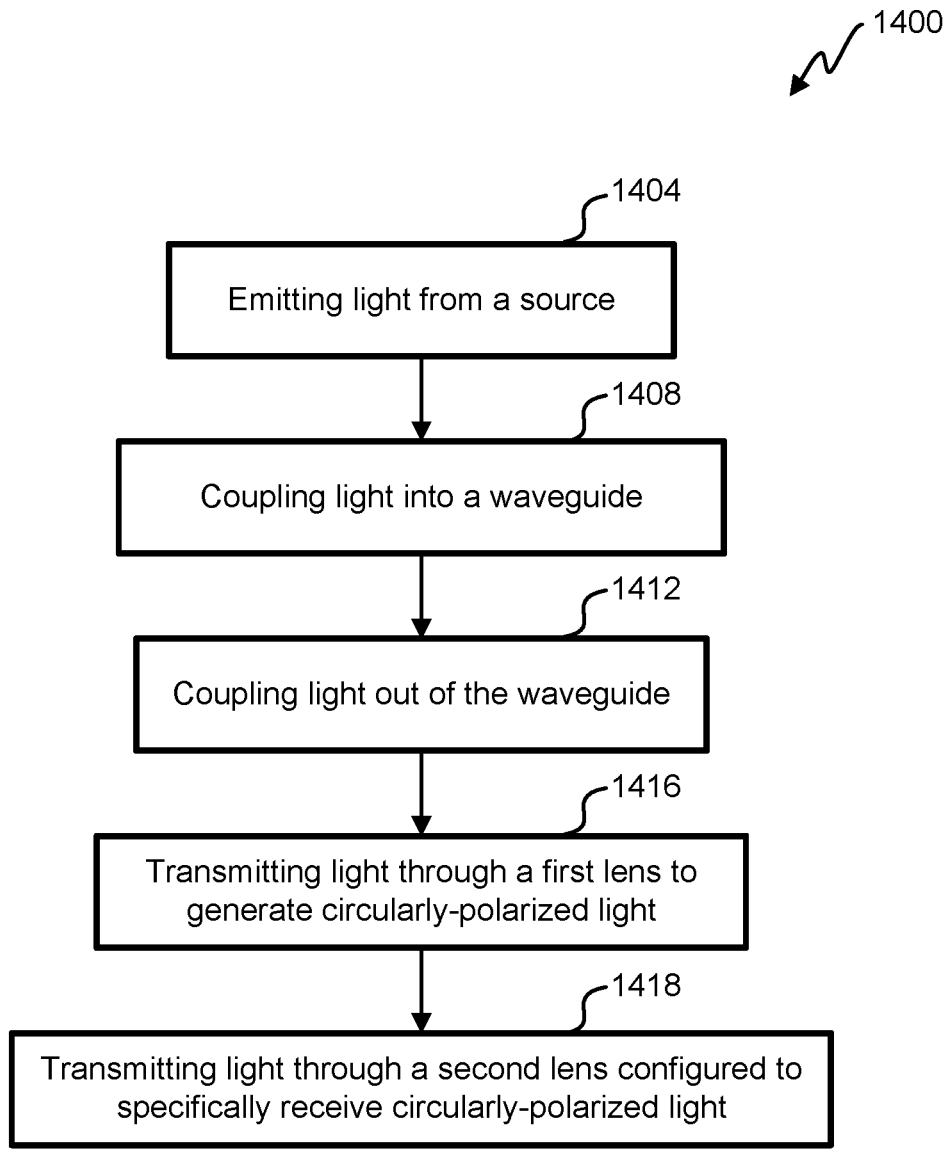
FIG. 14 illustrates an embodiment of a flowchart of a process for using a lens system.

FIG. 14 illustrates an embodiment of a flowchart of a process 1400 for using a lens system. Process 1400 begins with step 1404 with emitting light from a source (e.g., source 410). Light from the source is coupled into a waveguide (e.g., waveguide 604) using a coupling element (e.g., coupling element 350), step 1408. Light is guided through the waveguide to a decoupling element (e.g., decoupling element 365). The decoupling element is used to couple light out of the waveguide and toward an eye (e.g., eye 220) of a user, step 1412. In step 1416, light is transmitted through a first lens (e.g., waveplate 704) to generate circularly-polarized light. The first lens is made of an optically anisotropic material; the first lens does not comprise a polarizer; and the first lens is between the decoupling element and the eye of the user. In step 1418, light is transmitted through the second lens, wherein the second lens is configured to specifically receive circularly-polarized light (e.g., it is a PBP lens). The second lens is optically between the first lens and the eye of the user; and light is transmitted from the decoupling element and to the second lens without passing through a polarizer.

Figure 15:
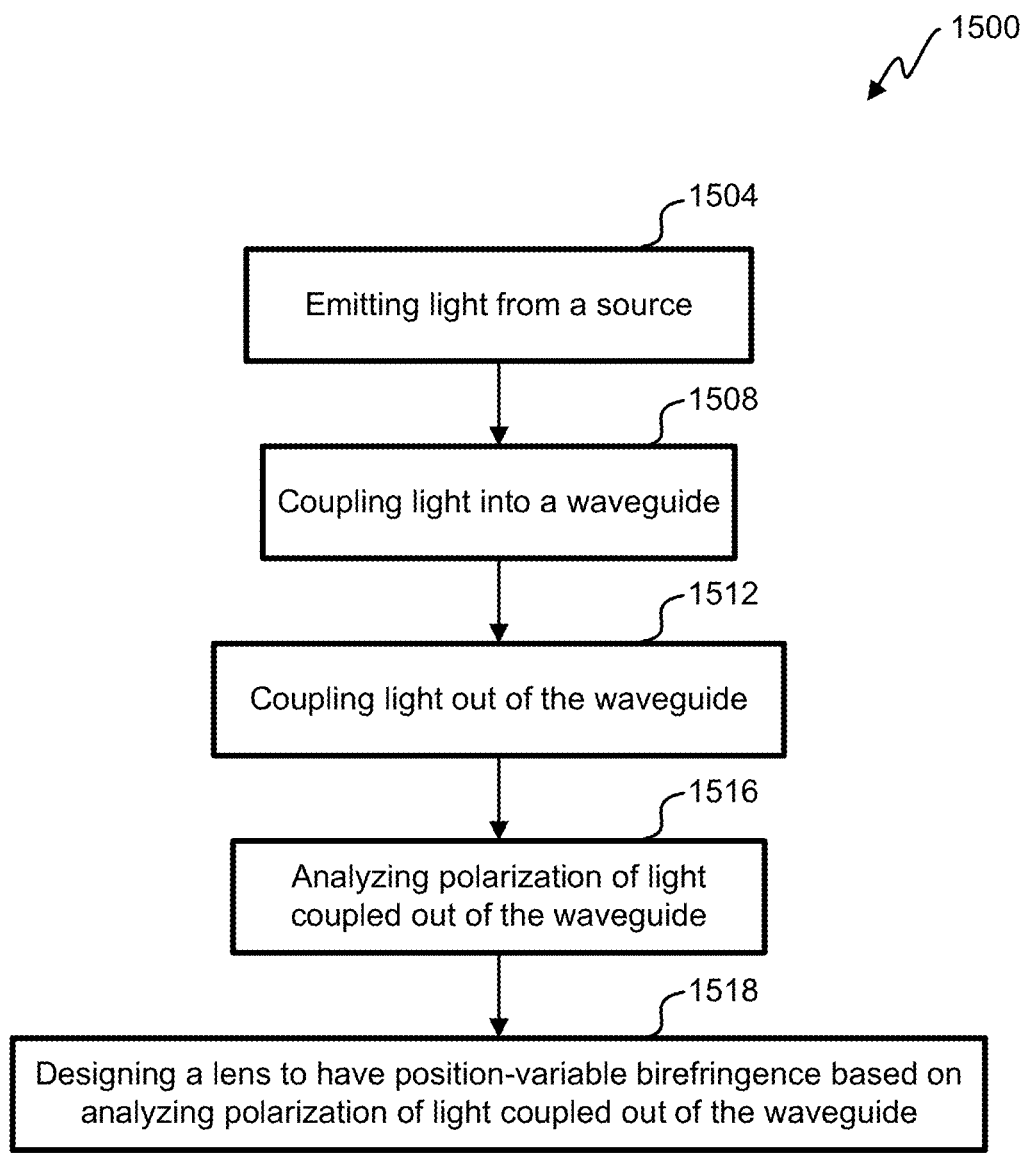
FIG. 15 illustrates an embodiment of a flowchart of a process for creating a lens having an anisotropic material with a birefringence property that varies spatially.

FIG. 15 illustrates an embodiment of a flowchart of a process 1500 for creating a lens (e.g., waveplate 704) having an anisotropic material with a birefringence that varies spatially. Process 1500 begins with step 1504 with emitting light from a source (e.g., source 410). Light from the source is coupled into a waveguide (e.g., waveguide 604) using a coupling element (e.g., coupling element 350), step 1508. Light is guided through the waveguide to a decoupling element (e.g., decoupling element 365). The decoupling element is used to couple light out of the waveguide, step 1512. In step 1516, polarization of light coupled out of the waveguide is analyzed. In step 1518, a lens (e.g., waveplate 704) is designed to have position-variable birefringence based on analyzing the polarization of light coupled out of the waveguide. In some embodiments, analyzing the polarization of light coupled out of the waveguide is performed by dividing the light into a plurality of zones (e.g., quadrants) and determining polarization of light in each zone (e.g., as discussed in relation with FIG. 11).

Light from an optical source (e.g., from source assembly 310 and/or source 410) can be coupled into one or more waveguides 604 by one or more coupling elements (e.g., coupling element 350). The light from the optical source can be polarized (e.g., emitted as polarized light or polarized before the coupling element 350). The light can be linearly polarized or elliptically polarized. In some embodiments, light from the optical source is not polarized before being coupled into the waveguide 604. In some embodiments, three waveguides 604 are used; one for red light, one for green light, and one for blue light. Light from a waveguide 604 is coupled out of the waveguide 604 by a decoupling element 365. The decoupling element can comprise a grating.

In some embodiments, the grating is configured to couple light out of the waveguide 604 so that the light is uniformly polarized, spatially (e.g., linearly polarized or elliptically polarized as discussed in conjunction with FIG. 9). A waveplate is designed to change the uniformly polarized light from the waveguide into circularly-polarized light (e.g., as discussed in conjunction with FIG. 10). Circularly-polarized light passes through a PBP lens and is focused by the PBP lens before reaching an eye 220 of a user of the near-eye display 100.

In some embodiments, light is coupled out of the waveguide 604 with a deterministic and spatially varying polarization (e.g., as discussed in conjunction with FIG. 11). The polarization of light in non-uniform. A waveplate is designed to match the non-uniform polarization of light exiting the one or more waveguides 604 to change the light into circularly-polarized light (e.g., as described in conjunction with FIG. 12). Circularly-polarized light passes through a PBP lens and is focused by the PBP lens before reaching an eye 220 of a user of the near-eye display 100.

In some embodiments, one or more circular polarizers are used to circularly polarize light in narrow bands (e.g., 30 nm bands; as discussed in conjunction with FIG. 13). The narrow bands correspond to emission bands of sources (e.g., LEDs) of an optical source. Circularly-polarized light passes through a PBP lens and is focused by the PBP lens before reaching an eye 220 of a user of the near-eye display 100.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
   an optical source;
   a waveguide;
   a coupling element, wherein the coupling element is configured to couple light from the optical source into the waveguide;
   a decoupling element, wherein the decoupling element is configured to couple light out of the waveguide so that light decoupled out of the waveguide has a uniform polarization;
   a waveplate, wherein the waveplate is configured to convert light with the uniform polarization into circularly-polarized light; and
   a geometric-phase lens configured to focus circularly-polarized light, wherein the waveplate is between the decoupling element and the geometric-phase lens, and wherein the waveplate and the geometric-phase lens are bonded together as part of a lens stack.

2. The system of claim 1, wherein the uniform polarization is elliptical polarization.

3. The system of claim 1, wherein light is polarized before entering into the waveguide.

4. The system of claim 1, wherein the geometric-phase lens is a Pancharatnam Berry Phase (PBP) liquid crystal lens.

5. The system of claim 1, wherein the waveplate has an anisotropic material that has a birefringence that is uniform across the waveplate.

6. The system of claim 1, wherein the system comprises a linear polarizer between the optical source and the coupling element.

7. The system of claim 1, further comprising a frame, wherein:
   the frame is part of glasses to be worn by a user; and
   the waveguide, the waveplate, and the geometric-phase lens are secured in the frame.

8. The system of claim 1, wherein:
   the lens stack is a first lens stack;
   the system further comprises a second lens stack;
   the second lens stack comprises a geometric-phase lens; and
   the waveguide is between the first lens stack and the second lens stack.

9. A system comprising:
   an optical source;
   a waveguide;
   a coupling element, wherein the coupling element is configured to couple light from the optical source into the waveguide;
   a decoupling element, wherein:
      the decoupling element couples light out of the waveguide; and
      light coupled out of the waveguide has a spatially-varying polarization;
   a waveplate, wherein the waveplate has a spatially-varying fast axis configured to convert light with the spatially-varying polarization into circularly-polarized light; and
   a geometric-phase lens configured to focus circularly-polarized light, wherein the waveplate is between the decoupling element and the geometric-phase lens.

10. The system of claim 9, wherein:
    the waveplate is divided into a plurality of zones;
    the plurality of zones includes a first zone and a second zone; and
    the waveplate comprises an optically anisotropic material having a fast axis with an orientation that varies, such that:
       the orientation of the fast axis in the first zone is at a first angle;
       the orientation of the fast axis in the second zone is at a second angle; and
       the first angle is not equal to the second angle.

11. The system of claim 10, wherein the plurality of zones creates a residual defocus of combined light that is below a threshold value.

12. The system of claim 10, wherein a number of the plurality of zones is equal to or greater than 25 and equal to or less than 225.

13. The system of claim 9, further comprising a linear polarizer between the optical source and the coupling element.

14. The system of claim 9, further comprising a frame, wherein:
the frame is part of glasses to be worn by a user; and
the waveguide, the waveplate, and the geometric-phase lens are secured in the frame.

15. The system of claim 9, wherein light exiting the waveguide has spatially-varying, elliptical polarization.

16. A system comprising:
an optical source;
a waveguide;
a coupling element, wherein the coupling element is configured to couple light from the optical source into the waveguide;
a decoupling element, wherein the decoupling element is configured to couple light out of the waveguide;
a geometric-phase lens configured to focus circularly-polarized light; and
a circular polarizer comprising:
a linear polarizer having a polarization bandwidth, wherein:
the polarization bandwidth is equal to or greater than 5 nm and equal to or less than 50 nm; and
the linear polarizer has a transmission axis; and
a waveplate, wherein a combination of the linear polarizer and the waveplate is configured to pass one handedness of circularly-polarized light and block a second handedness of circularly-polarized light.

17. The system of claim 16, wherein:
the linear polarizer is a first linear polarizer;
the polarization bandwidth is a first polarization bandwidth;
the system further comprises a second linear polarizer;
the second linear polarizer has a second polarization bandwidth, wherein:
the second polarization bandwidth is equal to or greater than 5 nm and equal to or less than 50 nm; and
the second polarization bandwidth is different than the first polarization bandwidth.

18. The system of claim 17, wherein the first linear polarizer is configured to polarize red light and the second linear polarizer is configured to polarize blue light.

19. The system of claim 17, wherein:
the system further comprises a third linear polarizer; and
the first linear polarizer, the second linear polarizer, and the third linear polarizer are part of the circular polarizer.

20. The system of claim 16, wherein the geometric-phase lens is between the decoupling element and the circular polarizer.

* * * * *